(12) United States Patent
Sone

(10) Patent No.: US 11,203,497 B2
(45) Date of Patent: Dec. 21, 2021

(54) IMAGE FORMING APPARATUS, AND NON-TRANSITORY COMPUTER READABLE RECORDING MEDIUM THAT STORES IMAGE FORMING PROGRAM

(71) Applicant: KYOCERA DOCUMENT SOLUTIONS INC., Osaka (JP)

(72) Inventor: Daiki Sone, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 63 days.

(21) Appl. No.: 16/892,354

(22) Filed: Jun. 4, 2020

(65) Prior Publication Data

US 2020/0385224 A1    Dec. 10, 2020

(30) Foreign Application Priority Data

Jun. 5, 2019    (JP) .............................. JP2019-105151

(51) Int. Cl.
| | |
|---|---|
| *G06K 15/00* | (2006.01) |
| *B41J 2/36* | (2006.01) |
| *B65H 5/06* | (2006.01) |
| *B41J 15/04* | (2006.01) |
| *B41J 2/02* | (2006.01) |
| *B41J 2/21* | (2006.01) |
| *B41J 11/00* | (2006.01) |

(52) U.S. Cl.
CPC ................ *B65H 5/062* (2013.01); *B41J 2/02* (2013.01); *B41J 2/36* (2013.01); *B41J 15/04* (2013.01); *G06K 15/4085* (2013.01); *B41J 2/2132* (2013.01); *B41J 11/006* (2013.01); *B41J 2203/01* (2020.08); *B65H 2601/11* (2013.01)

(58) Field of Classification Search
CPC ...... B65H 5/062; B65H 2601/11; B41J 15/04; B41J 2/36; B41J 2/02; B41J 2203/01; B41J 2/2132; B41J 11/006; G06K 15/4085

See application file for complete search history.

(56) References Cited

U.S. PATENT DOCUMENTS

2013/0201234 A1\* 8/2013 Sasayama .............. B41J 2/2146
347/12
2018/0059603 A1\* 3/2018 Miyahara ........... H04N 1/00029

FOREIGN PATENT DOCUMENTS

| JP | 2005157015 A | \* | 6/2005 | .............. B41J 29/38 |
| JP | 2005157015 A |   | 6/2005 | |

\* cited by examiner

*Primary Examiner* — Yaovi M Ameh
(74) *Attorney, Agent, or Firm* — Li & Cai Intellectual Property (USA) Office

(57) ABSTRACT

An image forming apparatus includes a controller circuitry configured to control the ink-jet module to form a density adjustive image pattern on one of the multiple sheets, detect a jam during continuous feeding, and then determine whether or not images, which are to be formed on one or more fed-and-unejected sheets, include the density adjustive image pattern, where the images include the density adjustive image pattern, determine whether or not the unejected sheet, on which the density adjustive image pattern is to be formed, has passed through a certain position of the sheet conveyer path, and control the ink-jet module, where the unejected sheet, on which the density adjustive image pattern is to be formed, has passed through the certain position, not to re-form the density adjustive image pattern and to re-form images on rest of the unejected sheets.

5 Claims, 3 Drawing Sheets

IMAGE FORMING APPARATUS, AND NON-TRANSITORY COMPUTER READABLE RECORDING MEDIUM THAT STORES IMAGE FORMING PROGRAM

CROSS-REFERENCE TO RELATED PATENT APPLICATION

This application claims the benefit of Japanese Priority Patent Application JP 2019-105151 filed Jun. 5, 2019, the entire contents of which are incorporated herein by reference.

FIELD OF THE DISCLOSURE

The present disclosure relates to an image forming apparatus, and a non-transitory computer readable recording medium that stores an image forming program.

FIELD OF THE DISCLOSURE

Typically, in the field of image forming apparatuses such as MFPs (Multi-Functional Peripherals) or printers, adjustive printing for confirming density and the like is executed at regular intervals to maintain a high print quality.

SUMMARY OF THE DISCLOSURE

It is desirable to avoid unnecessary re-printing of an image forming apparatus and to reduce costs.

According to an embodiment of the present disclosure, there is provided an image forming apparatus, including:

a sheet-feeder module configured to feed sheets into a sheet conveyer path;

an ink-jet module configured to jet ink droplets onto multiple sheets continuously fed into the sheet conveyer path to form images; and a controller circuitry configured to control the ink-jet module to form a density adjustive image pattern on one of the multiple sheets, detect a jam during continuous feeding, and then determine whether or not images, which are to be formed on one or more fed-and-unejected sheets, include the density adjustive image pattern, where the images include the density adjustive image pattern, determine whether or not the unejected sheet, on which the density adjustive image pattern is to be formed, has passed through a certain position of the sheet conveyer path, and control the ink-jet module, where the unejected sheet, on which the density adjustive image pattern is to be formed, has not passed through the certain position, to re-form images on the unejected sheets, and where the unejected sheet, on which the density adjustive image pattern is to be formed, has passed through the certain position, not to re-form the density adjustive image pattern and to re-form images on rest of the unejected sheets, the certain position being a position at which the ink-jet module has completed ink-jetting to form the density adjustive image pattern.

According to another embodiment of the present disclosure, there is provided a non-transitory computer readable recording medium that stores an image forming program that causes an image forming apparatus to feed sheets into a sheet conveyer path;

to jet ink droplets onto multiple sheets continuously fed into the sheet conveyer path to form images;

to form a density adjustive image pattern on one of the multiple sheets;

to detect a jam during continuous feeding, and then determine whether or not images, which are to be formed on one or more fed-and-unejected sheets, include the density adjustive image pattern;

where the images include the density adjustive image pattern, to determine whether or not the unejected sheet, on which the density adjustive image pattern is to be formed, has passed through a certain position of the sheet conveyer path;

where the unejected sheet, on which the density adjustive image pattern is to be formed, has not passed through the certain position, to re-form images on the unejected sheets; and where the unejected sheet, on which the density adjustive image pattern is to be formed, has passed through the certain position, not to re-form the density adjustive image pattern and to re-form images on rest of the unejected sheets, the certain position being a position at which the ink-jet module has completed ink-jetting to form the density adjustive image pattern.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. Hardware Configuration of Image Forming Apparatus

Figure 1:
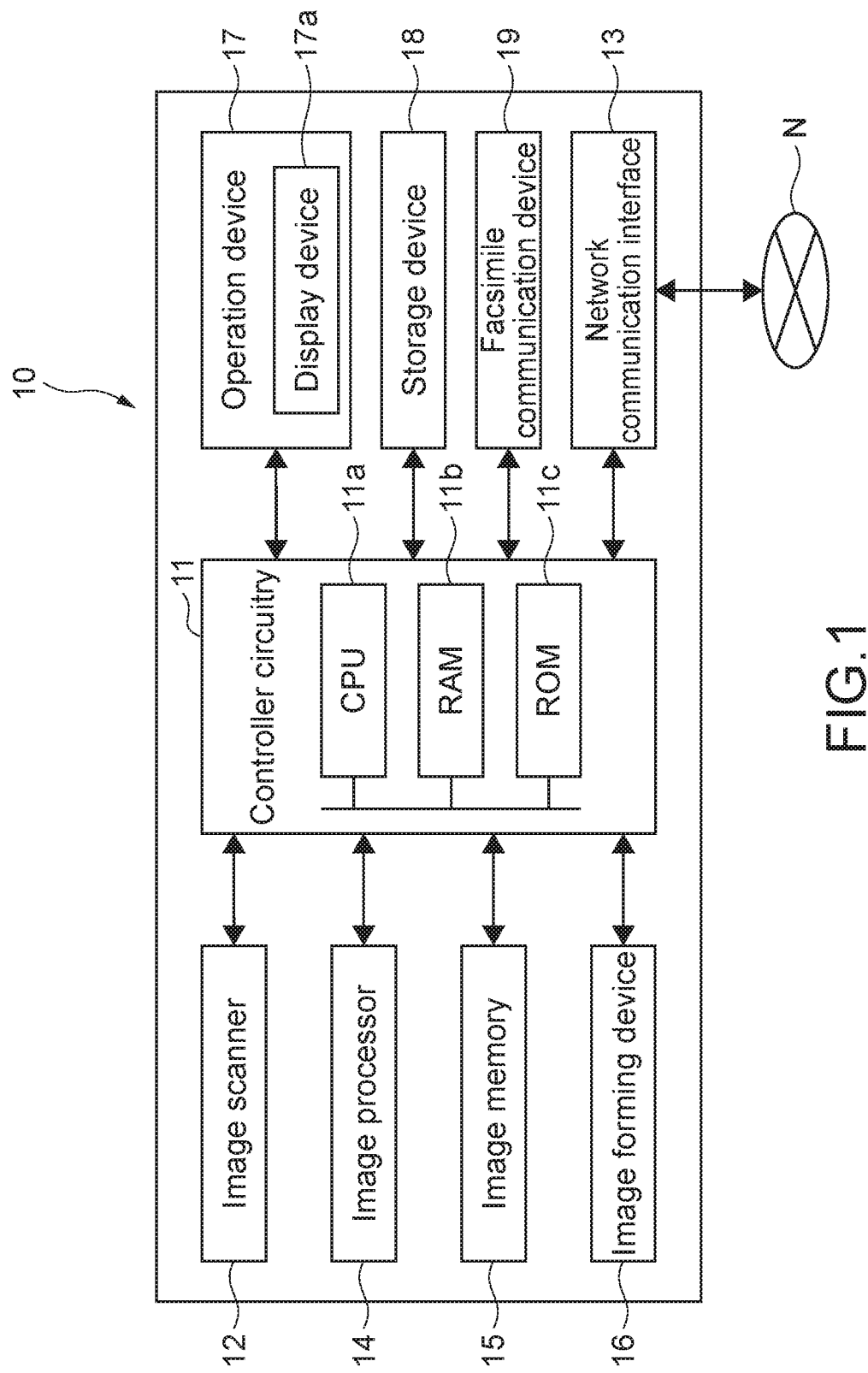
FIG. 1 shows a hardware configuration of an image forming apparatus according to an embodiment of the present disclosure.

FIG. 1 shows a hardware configuration of an image forming apparatus according to an embodiment of the present disclosure.

A hardware configuration of the image forming apparatus 10 will be described. The image forming apparatus 10 includes the controller circuitry 11. The controller circuitry 11 includes the CPU (Central Processing Unit) 11a, the RAM (Random Access Memory) 11b, the ROM (Read Only Memory) 11c, dedicated hardware circuitries, and the like and performs overall operational control of the electronic apparatus 10. The CPU 11a loads information processing programs stored in the ROM 11c in the RAM 11b and executes the information processing programs. The ROM 11c is a nonvolatile memory that stores programs executable by the CPU 11a, data, and the like. The ROM 11c is an example of a non-transitory computer readable recording medium.

The controller circuitry 11 is connected to the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuitry 11 performs operational control of the respective devices connected thereto and sends/receives signals and data to/from those devices. The operation device 17 (touch panel) is one mode of an input device. A sound input device including a microphone may be provided as an input device. The network communication interface 13 is communicably connected to the external network N.

2. Internal Configuration of Image Forming Apparatus

Figure 2:
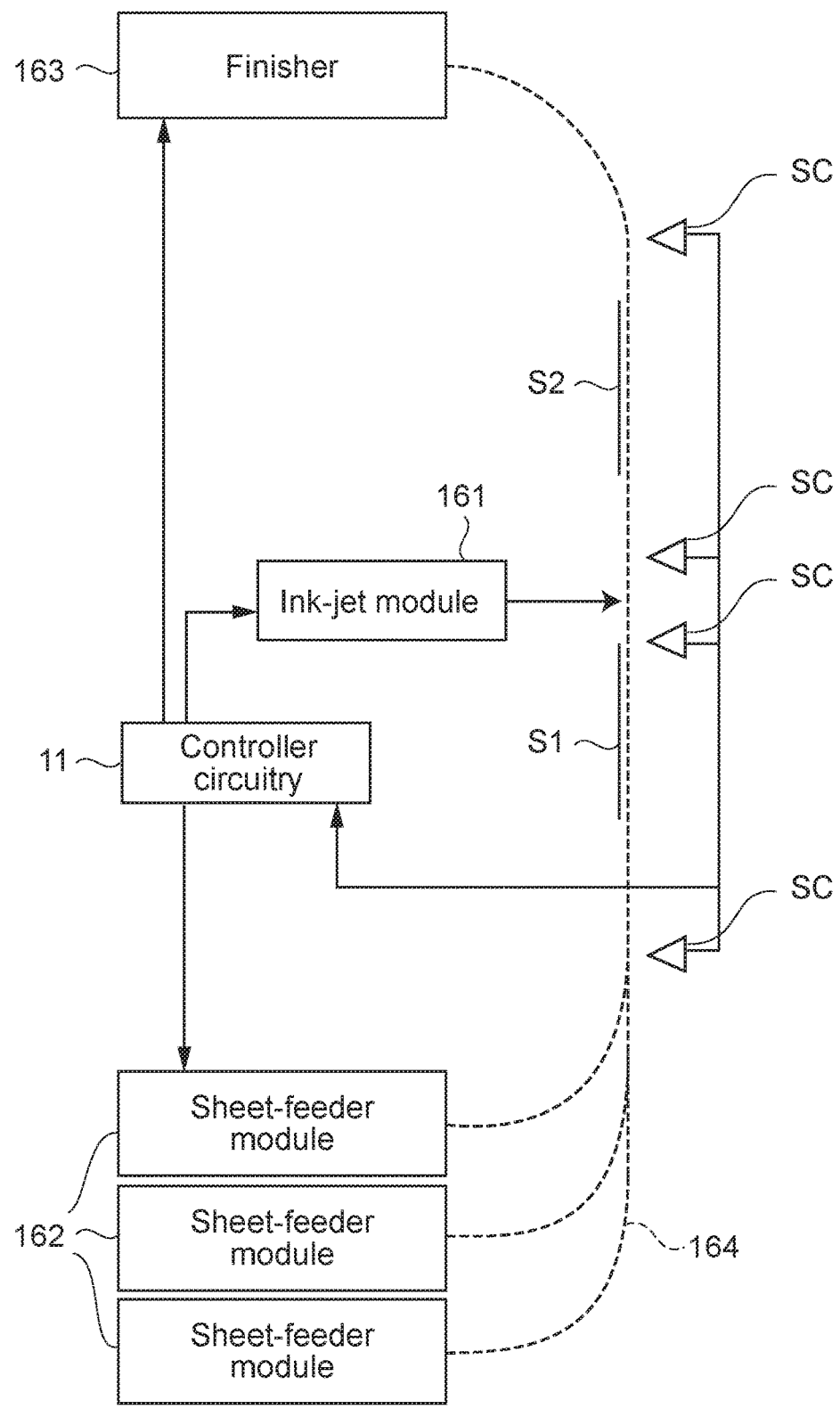
FIG. 2 schematically shows an internal configuration of the image forming apparatus.

FIG. 2 schematically shows an internal configuration of the image forming apparatus.

The image forming device 16 forms images by the ink-jet method or like of jetting ink droplets to attach the ink droplets on the sheet S. The image forming device 16 includes the ink-jet module 161, the sheet-feeder module 162, and the finisher 163. The image forming device 16 further includes ink tanks and conveyer rollers in addition, which are not shown to simplify the drawings. The image forming device 16 includes the sheet conveyer path 164 with the conveyer rollers.

The controller circuitry 11 controls the ink-jet module 161, the sheet-feeder module 162, and the finisher 163. The controller circuitry 11 assigns sheet IDs to the sheets S fed from the sheet-feeder module 162 one by one, and controls conveyance of the sheets S. In FIG. 2, an arrow extending toward the dotted line of the sheet conveyer path 164 shows a position at which the ink-jet module 161 jets droplets. The position will be referred to as "ink-jet position" hereinafter.

The sheet-feeder module 162 stores the multiple sheets S. In response to a feed instruction signal from the controller circuitry 11, the sheet-feeder module 162 feeds the sheets S into the sheet conveyer path 164 at certain timings one by one. The sheet-feeder module 162 includes an A4-size tray, a B5-size tray, and the like that support the sizes of the sheets S. The sheet-feeder module 162 may include a manual feeder tray.

The controller circuitry 11 controls the ink-jet module 161 to jet ink droplets of multiple-color ink including black ink. The controller circuitry 11 controls the ink-jet module 161 to jet ink droplets at the timing when the sheet S is conveyed into the jet area of the ink-jet module 161. By controlling ink-jet and conveyance in combination in such a way, the controller circuitry 11 forms an image on the sheet S.

The image forming device 16 further includes the one or more sensors SC on the sheet conveyer path 164. The sensor SC detects that the end (i.e., the front end or the back end) of the sheet S has passed through a certain position, and notifies the controller circuitry 11 of the detection result. The sheet-feeder module 162 may also have the sensor SC, which detects the timing at which the sheet S is fed and notifies the controller circuitry 11 of the detection result.

The finisher 163 includes a tray for storing the sheets S on which images are formed, a stapler, and the like.

3. Operational Flow of Image Forming Apparatus

Figure 3:
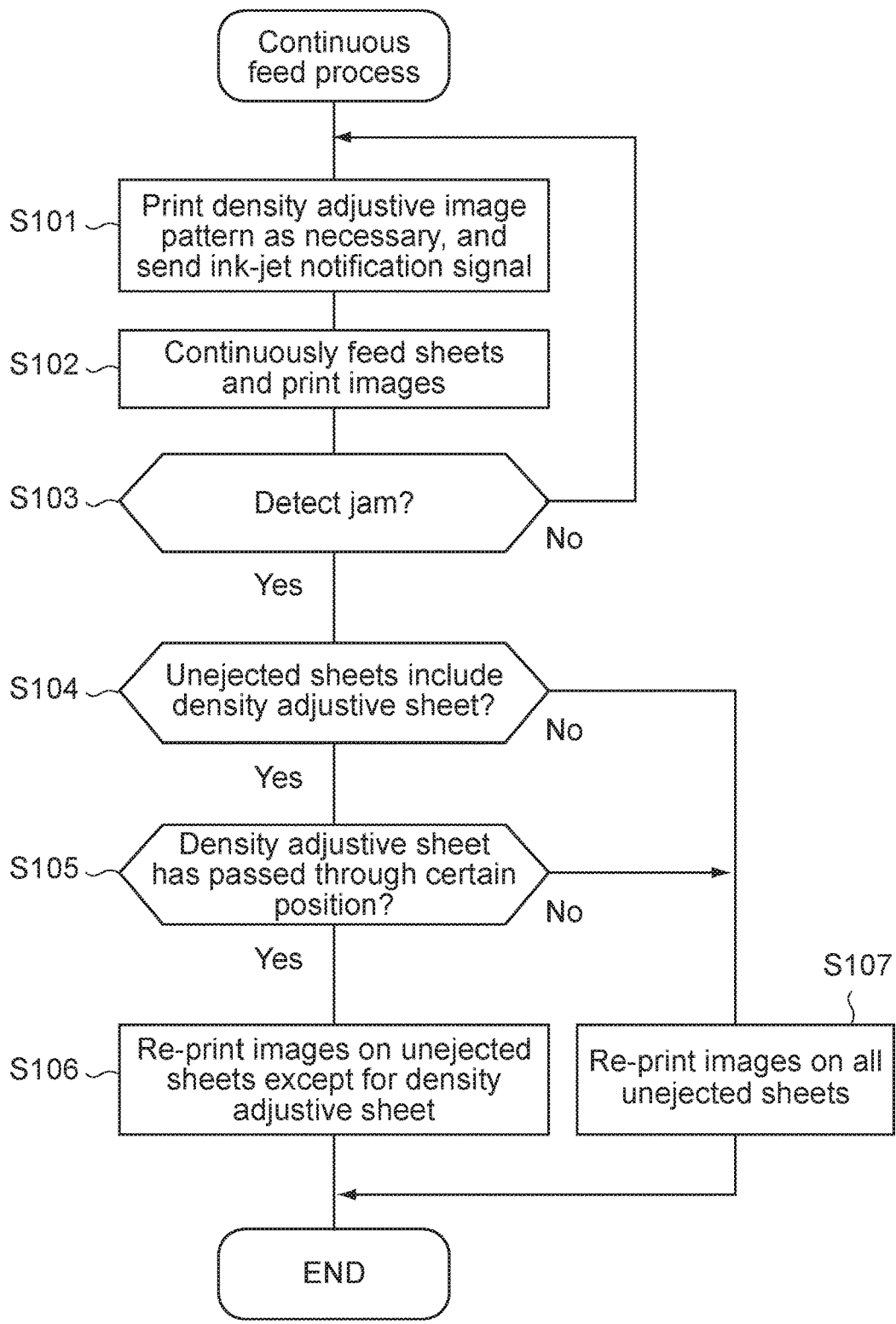
FIG. 3 shows an operational flow of the image forming apparatus.

FIG. 3 shows an operational flow of the image forming apparatus.

This operational flow shows the continuous feed process, i.e., specifically, the print control flow of the controller circuitry 11. In the continuous feed process, the image processor 14 renders a set of documents one page by one page, and the set of documents is printed and output at a very high speed. In the continuous feed process, the image forming device 16 continuously feeds multiple sheets, on which images of the respective pages are to be printed, (i.e., the sheet-feeder module 162 continuously feeds the sheet, and conveys the sheet on the sheet conveyer path 164) and forms images.

The controller circuitry 11 controls the image forming device 16 to execute adjustive printing for confirming density and the like at regular intervals to maintain a high print quality. The controller circuitry 11 executes the adjustive printing also during the continuous feed process.

(Step S101)

In the continuous feed process, the controller circuitry 11 controls the ink-jet module 161 to print a certain density adjustive image pattern as necessary. The density adjustive image pattern is used to confirm density and the like to maintain a high print quality. This printing will be referred to as adjustive printing. Further, hereinafter, the sheet S on which the density adjustive image pattern is printed will be referred to as "density adjustive sheet". The ink-jet module 161 forms an image of the density adjustive image pattern, and then sends a signal, which indicates that the image is formed, to the controller circuitry 11.

(Step S102) Next, the controller circuitry 11 controls the image forming device 16 to continuously feed sheets and print images. The order of the density adjustive printing and the normal printing is not limited. For example, images are continuously printed on five sheets, and the density adjustive image pattern is printed on one sheet.

(Step S103)

Next, the controller circuitry 11 confirms whether or not the sensors SC detect a jam. Where the sensors SC detect a jam, the process returns to Step S101. Until a jam is detected, the controller circuitry 11 continues the continuous feeding and printing.

(Step S104)

Where the sensors SC detect a jam, the controller circuitry 11 firstly confirms whether or not unejected sheets include a density adjustive sheet.

Now a typical operation of the image forming device 16 at the time of a jam will be described. In the continuous feed process, multiple sheets (e.g., the sheet 51 and the sheet S2 of FIG. 2) are conveyed into the sheet conveyer path 164. The image forming device 16 drives conveyer rollers and the like, which are provided along the sheet conveyer path 164. As a result, the image forming device 16 completely ejects the sheet, which is on the downstream (in the direction toward the finisher 163) of the jam position. To the contrary, an unejected sheet remains between the jam position and the sheet-feeder module 162 (i.e., upstream of jam position).

(Step S105)

Where the unejected sheets includes a density adjustive sheet (Step S104/Yes), the controller circuitry 11 determines whether or not the density adjustive sheet has passed through a certain position based on the detection result of the sensors SC. The controller circuitry 11 assigns an ID (identifier) to each one of the sheets S conveyed. Further, the controller circuitry 11 obtains the position of the sheet S, which is a density adjustive sheet, based on the detection result of the sensors SC.

In the present embodiment, the certain position is a position at which the ink-jet module 161 has completed ink-jetting to form the density adjustive image pattern. For example, where the back end of the density adjustive sheet has passed through the ink-jet position of the ink-jet module 161, then the ink-jet is finished without fail. To the contrary, where the front end of the density adjustive sheet has not passed through the ink-jet position of the ink-jet module 161, then the ink-jet is not executed (not even started) without fail. Where the density adjustive sheet is between those two positions, it is not clear whether or not the ink-jet is finished.

In view of the aforementioned circumstances, according to the present embodiment, the certain position is a position on the sheet conveyer path 164, and is downstream of the ink-jet position by a length of the density adjustive image pattern in a conveyance direction of the sheet. For example, the length of the image pattern in the conveyance direction is 10 cm. In such a case, where the front end of the density adjustive sheet is conveyed at the position 10 cm forward (i.e., downstream) after the front end passes through the ink-jet position, the ink-jet module 161 has formed the image of the image pattern without fail. In such a case, even if the back end of the density adjustive sheet has not passed through the ink-jet position, the controller circuitry 11 determines that the image of the density adjustive image pattern is formed.

(Step S106 and Step S107)

Where the density adjustive sheet has passed through the certain position, the controller circuitry 11 re-prints corresponding images on the unejected sheets except for the density adjustive sheet. To the contrary, where the density adjustive sheet has not passed through the certain position (Step S105/No) or where the unejected sheets does not include the density adjustive sheet (Step S104/No), the controller circuitry 11 re-prints corresponding images on all the unejected sheets.

Further, also where the ink-jet module 161 has notified the controller circuitry 11 that the image of the density adjustive image pattern is formed in Step S101, the controller circuitry 11 re-prints corresponding images on the unejected sheets except for the density adjustive sheet.

In the present embodiment, the density adjustive image pattern is not re-formed in Step S106. The reason is as follows. The density adjustive process is executed in order to avoid clogging of nozzle heads of the ink-jet module 161 with dried droplets and the like. Where ink droplets have jetted onto the density adjustive sheet, then it means that clogging of nozzle heads is avoided. Even if the density adjustive sheet is not ejected, it is not necessary to re-print the density adjustive image pattern. In view of the aforementioned circumstances, according to the present embodiment, the density adjustive image pattern is re-printed only when it is necessary to re-print it as a result of the internal processing, and the density adjustive image pattern is not re-printed when it is not necessary to do so. As a result, the user's costs may be minimized.

4. Conclusion

A jam may occur when an image forming apparatus conveys sheets. The jam is also referred to as "paper jam". Typically, when a jam occurs, a user manually removes clogging sheets. Then the image forming apparatus re-prints all corresponding images on the sheets remaining in the image forming apparatus except for the ejected sheets. However, it is not necessary to re-print an image for adjustive printing. Unnecessary printing may increase user's costs.

(1) To the contrary, according to the present embodiment, when a jam occurs during continuous feeding and image forming, an image is re-formed on an unejected sheet, on which the image has been formed. As a result, no page is lost in printed documents. Meanwhile, a density adjustive image pattern is not re-formed. As a result, the user's costs for re-printing may be minimized.

(2) According to the present embodiment, the image forming apparatus includes a conveyance detection sensor. As a result, the conveyance detection sensor detects that the unejected sheet has passed through a certain position reliably.

(3) According to the present embodiment, where the ink-jet of the density adjustive image pattern is finished, the ink-jet module sends a notification signal to the controller circuitry, and the controller circuitry controls the ink-jet module not to re-print the density adjustive image pattern based on the signal. As a result, the user's costs for re-printing may be minimized.

(4) In the present embodiment, the certain position on the sheet conveyer path is downstream of an ink-jet position of the ink droplets by an image length of the density adjustive image pattern (in a conveyance direction of the sheet). Where the front end of the unejected sheet corresponding to the image pattern has passed through this position, it is determined that the image pattern is not to be re-formed. As a result, when a jam occurs, it is possible to appropriately determine whether or not the density adjustive processing is substantially done.

It should be understood by those skilled in the art that various modifications, combinations, sub-combinations and alterations may occur depending on design requirements and other factors insofar as they are within the scope of the appended claims or the equivalents thereof

What is claimed is:

1. An image forming apparatus, comprising:
a sheet-feeder module configured to feed sheets into a sheet conveyer path;
an ink-jet module configured to jet ink droplets onto multiple sheets continuously fed into the sheet conveyer path to form images; and
a controller circuitry configured to
control the ink-jet module to form a density adjustive image pattern on one of the multiple sheets,
detect a jam during continuous feeding, and then determine whether or not images, which are to be formed on one or more fed-and-unejected sheets, include the density adjustive image pattern,
where the images include the density adjustive image pattern, determine whether or not the unejected sheet, on which the density adjustive image pattern is to be formed, has passed through a certain position of the sheet conveyer path, and
control the ink-jet module,
where the unejected sheet, on which the density adjustive image pattern is to be formed, has not passed through the certain position, to re-form images on the unejected sheets, and
where the unejected sheet, on which the density adjustive image pattern is to be formed, has passed through the certain position, not to re-form the density adjustive image pattern and to re-form images on rest of the unejected sheets,
the certain position being a position at which the ink-jet module has completed ink-jetting to form the density adjustive image pattern.

2. The image forming apparatus according to claim 1, further comprising:
one or more conveyance detection sensors provided on the sheet conveyer path and configured to detect a sheet that passes through the sheet conveyer path, wherein
the controller circuitry is configured to determine whether or not the unejected sheet has passed through the certain position based on a detection result of the conveyance detection sensor.

3. The image forming apparatus according to claim 1, wherein
the ink-jet module is configured to, where ink-jet of the density adjustive image pattern is finished, send a notification that the ink-jet of the density adjustive image pattern is finished to the controller circuitry, and
the controller circuitry is configured to receive the notification that the ink-jet of the density adjustive image pattern is finished, and then control the ink-jet module not to re-form the density adjustive image pattern.

4. The image forming apparatus according to claim 1, wherein
the controller circuitry is configured to
detect a jam during continuous feeding, and
where images, which are to be formed on one or more fed-and-unejected sheets, include the density adjustive image pattern,
determine whether or not a front end of the unejected sheet, on which the density adjustive image pattern is to be formed, has passed through a certain position of the sheet conveyer path,
the certain position being a position on the sheet conveyer path, the position being downstream of an ink-jet position of the ink droplets from the ink-jet module by a length of the density adjustive image pattern in a conveyance direction of the sheet.

5. A non-transitory computer readable recording medium that stores an image forming program that causes an image forming apparatus
to feed sheets into a sheet conveyer path;
to jet ink droplets onto multiple sheets continuously fed into the sheet conveyer path to form images;
to form a density adjustive image pattern on one of the multiple sheets;
to detect a jam during continuous feeding, and then determine whether or not images, which are to be formed on one or more fed-and-unejected sheets, include the density adjustive image pattern;
where the images include the density adjustive image pattern, to determine whether or not the unejected sheet, on which the density adjustive image pattern is to be formed, has passed through a certain position of the sheet conveyer path;
where the unejected sheet, on which the density adjustive image pattern is to be formed, has not passed through the certain position, to re-form images on the unejected sheets; and
where the unejected sheet, on which the density adjustive image pattern is to be formed, has passed through the certain position, not to re-form the density adjustive image pattern and to re-form images on rest of the unejected sheets,
the certain position being a position at which the ink-jet module has completed ink-jetting to form the density adjustive image pattern.

* * * * *